No. 761,777. PATENTED JUNE 7, 1904.
C. W. MAXON.
PNEUMATIC TIRE.
APPLICATION FILED NOV. 2, 1903.
NO MODEL.

WITNESSES:
W. A. Cathcart.
A. A. Easterly.

Carl W. Maxon INVENTOR

BY
Geo. B. Willcox, ATTORNEY

No. 761,777. Patented June 7, 1904.

UNITED STATES PATENT OFFICE.

CARL W. MAXON, OF WEST BAY CITY, MICHIGAN, ASSIGNOR OF TWO-THIRDS TO STANLEY A. BUSH, OF SOUTH ARM, MICHIGAN, AND WALTER L. FRENCH, OF EAST JORDAN, MICHIGAN.

PNEUMATIC TIRE.

SPECIFICATION forming part of Letters Patent No. 761,777, dated June 7, 1904.

Application filed November 2, 1903. Serial No. 179,610. (No model.)

*To all whom it may concern:*

Be it known that I, CARL W. MAXON, a citizen of the United States, residing at West Bay City, in the county of Bay and State of Michigan, have invented certain new and useful Improvements in Pneumatic Tires; and I do hereby declare the following to be a full, clear, and exact description of the invention, such as will enable others skilled in the art to which it appertains to make and use the same.

This invention is a pneumatic tire for bicycles, automobiles and sulkies, and other vehicles.

The object of the invention is to so construct the tire as to render it practically puncture-proof, and the improvements consist in certain devices, their combinations, and the equivalents thereof, as will be fully set forth in this specification.

The invention is illustrated in the accompanying drawings, in which—

Figure 1:
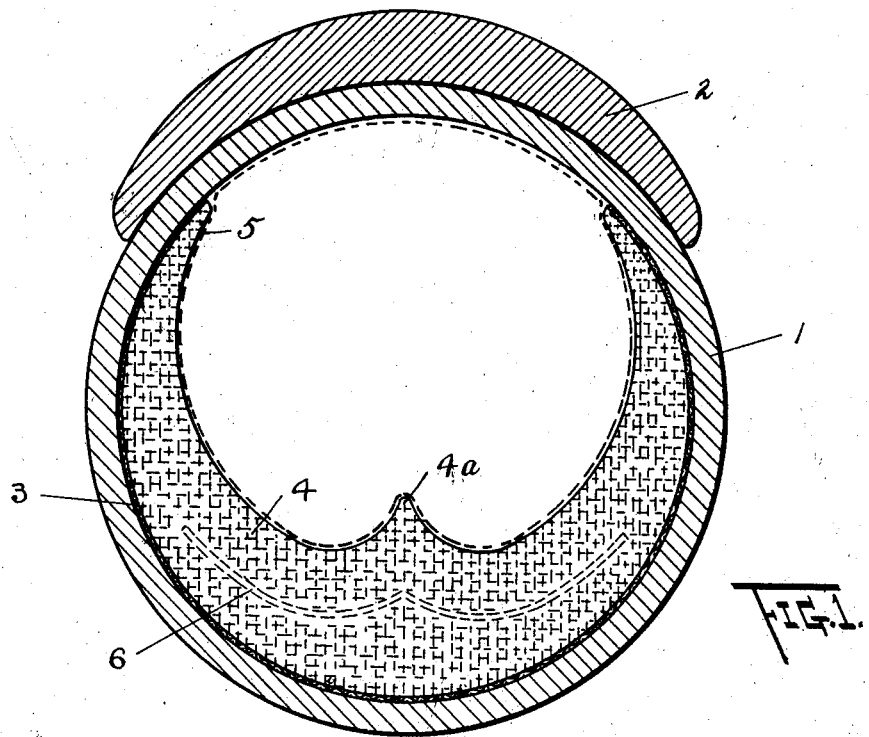
Figure 2:
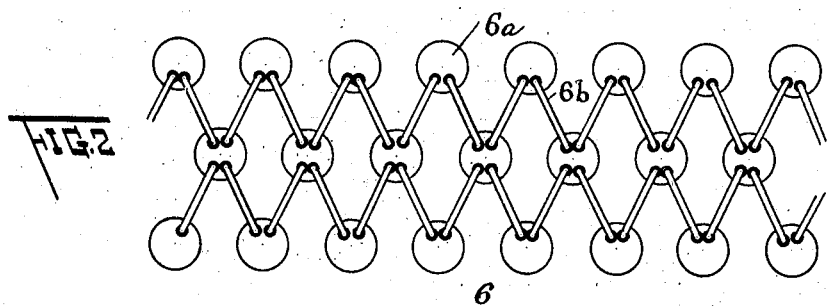

Figure 1 is an enlarged cross-section of a tire and bicycle-rim, and Fig. 2 is an enlarged detail of the reinforcing-chain.

As is clearly shown in the drawings, the tire is made up of the usual outer shell or casing 1, secured to the wheel-rim 2 in any suitable manner. Inside the casing 1 is secured a layer of fibrous cloth 3, preferably made of asbestos woven into a texture of about the fineness and thickness of common canvas. This layer may be made to extend clear around the inner circumference of the casing 1, but is preferably omitted from that part of the casing included in the space covered by the rim 2. Inside this layer made of asbestos cloth is a pad 4, forming a practically puncture-proof construction. This pad is made of asbestos felt, which is a somewhat spongy yet homogeneous mass of asbestos. The general cross-sectional contour of the pad is that of a crescent, but immediately over the tread of the tire the thickness of the pad is increased to form an upwardly-projecting rib $4^a$, which greatly increases the thickness of the pad above the tread without greatly increasing the quantity of asbestos required.

In applying the layer 3 to the outer casing 1 I first saturate the layer with liquid rubber and then vulcanize the layer to the casing. Similarly the outer surface of the pad 4 is vulcanized to the layer 3, and the inner surface of the pad 4 is also coated with liquid rubber, which is absorbed a short distance into the pad and is then vulcanized, forming a rubber coating over the top of the pad.

A tire of this description is adapted to be used as a single-tube tire; but, if desired, an inner tube 5 (indicated by dotted lines in Fig. 1) may be inserted, making a double-tube tire.

In order to further increase the puncture-resisting properties of the tire, I prefer to build into the body of the pad 4 a metallic plate or chain 6, which extends substantially horizontally across the portion of the pad that is directly above the tread of the tire. This chain 6 may be built in any suitable manner; but I prefer the device shown in Fig. 2, where $6^a$ are small metallic disks, and $6^b$ are links connecting the disks to form a flexible chain or plate. The mesh of the chain is sufficiently open to permit the fibers of the pad 4 to pass through the interstices, and so bind the upper and lower parts of the pad together that they are practically integral, the chain 6 being embedded therein and forming an integral part with the pad.

In Fig. 1 I have shown the cross-section of the chain as being practically parallel with the upper curved surface of the pad 4 and projection $4^a$; but, if desired, the chain may be flat, presenting a straight horizontal cross-section instead of that of the form illustrated.

The upwardly-projecting point $4^a$, which in the complete tire forms an internal rib extending clear around the wheel, serves to greatly strengthen the tread where it is most liable to be punctured and is of such form that it imparts the necessary strength without greatly increasing the weight of the tire or the amount of material used in the pad.

By saturating the asbestos layer 3 and the inner surface of the pad with liquid rubber and then treating the rubber so as to form a flexible coating or shell both outside and inside the asbestos pad is made durable and will effectually resist tendency to crack or deteriorate in use. The chain 6 is preferably employed in tires that have to support very heavy weights, as in automobiles, trucks, and like vehicles, and forms a flexible metallic reinforcement for the tread of the tire.

While I have described the asbestos cloth 3 and the pad 4 as being vulcanized to the inner surface of the casing 1, I do not desire to confine myself strictly to this construction, as it is preferable in some cases to make the pad 4 and asbestos cloth 3 in one piece which is removable from the outer casing 1 instead of being vulcanized thereto.

What I claim as my invention, and desire to secure by Letters Patent, is as follows:

1. In a tire the combination of the outer casing; a layer of asbestos cloth extending around the lower portion of the inner circumference of said casing, and vulcanized thereto; a crescent-shaped pad of asbestos felt having an inwardly-projecting medial rib formed on the thickest portion of said crescent, the inner and outer surfaces only of said crescent-shaped pad being treated with rubber and vulcanized; and a flexible metallic chain embedded in said pad, said chain having interstices of relatively large area; for the purposes set forth.

2. In a pneumatic tire, the combination with the outer casing, of a crescent-shaped pad of asbestos felt having an inwardly-projecting medial rib formed on the thickest portion of said crescent, the inner and outer surfaces only of said crescent-shaped pad being treated with rubber and vulcanized; and a flexible metallic chain embedded in said pad, said chain having interstices of relatively large area, for the purposes set forth.

3. In a pneumatic tire, the combination with the outer casing, of a crescent-shaped pad of asbestos felt having an inwardly-projecting medial rib formed on the thickest portion of said crescent, the inner and outer surfaces only of said crescent-shaped pad and medial rib being treated with rubber and vulcanized, for the purposes set forth.

In testimony whereof I affix my signature in presence of two witnesses.

CARL W. MAXON.

Witnesses:
J. S. SEE,
W. I. CATHCART.